Aug. 8, 1950     J. B. BRENNAN     2,517,762
BEARING MANUFACTURE
Filed Sept. 23, 1944
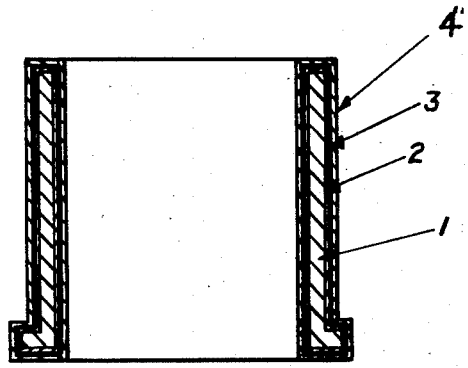
FIG. I
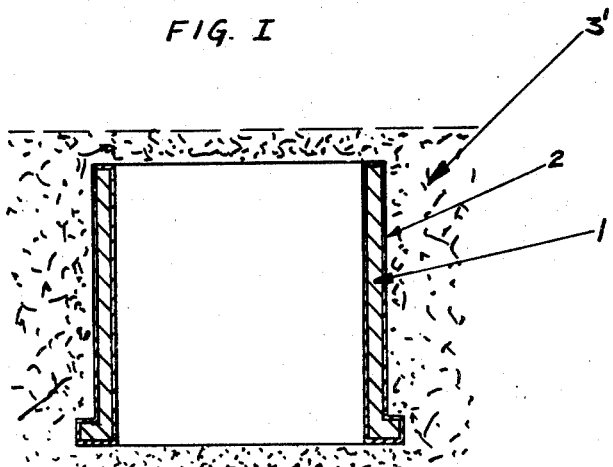
FIG. II
*Joseph B. Brennan*
INVENTOR Patented Aug. 8, 1950

2,517,762

UNITED STATES PATENT OFFICE 2,517,762

BEARING MANUFACTURE

Joseph B. Brennan, Bratenahl, Ohio

Application September 23, 1944, Serial No. 555,458

15 Claims. (Cl. 22—204)

This invention relates to an improved laminated bearing of the kind wherein a supporting backing as of steel is coated with an antifriction metal or alloy or mixture on its wearing surfaces. Usually bearings of the type covered by this invention include steel backed sleeve bearings wherein the steel backing is coated with silver or a copper tin lead mixture. One of the great difficulties between the steel backing and its coatings of antifriction metals such as silver or copper tin lead mixtures or alloys is to secure good adhesion.

This application is a continuation in part of my copending application Serial No. 552,501, filed September 2, 1944, now Patent No. 2,478,037.

In the annexed drawing:

Fig. I is an axial section through a bearing in process of manufacture according to the present invention; and Fig. II is a similar view with modified equipment.

As an example in carrying out my invention I first take a steel blank 1, Fig. I, and cover all or a part of it with a closely associated layer or layers of silver or other antifriction metals fuseable to the steel shell and suitable for the purpose intended and of an economical desired thickness, say .004" to .025".

Next I preferably coat this steel coated blank with a thin uniform conductive layer 3, Fig. I, of graphite whereupon I preferably cover as by electroplating the graphite coated blank with a layer of iron 4 to a thickness of about .010" more or less.

Thereafter I take the entire unit and place it in a furnace for example similar to that illustrated in the drawings in my copending application, Serial No. 552,501, filed September 2, 1944, now Patent No. 2,478,037, and subject the unit to heat and if desired pressure as described in aforementioned copending application. If the heat is up to or above the fusion point of for example silver where silver is used, then little or no pressure is necessary to bond the silver and steel shell together.

As an aid in securing a better bond the steel shell may be precoated with a metal such as nickel as by electroplating a very thin layer thereover prior to electroplating silver thereover.

In certain cases it may not be desired to coat the entire bearing with antifriction metal such as silver but only a portion thereof. In such cases the edges of the silver may be prewelded to the steel to prevent seepage of electrolyte therein from the subsequent electroplating of the iron sheath onto the silver coated steel shell prior to heat fusion in the furnace.

After the iron covered assembly Fig. I has been subjected to heat or heat and pressure for a short time sufficient to be certain of fusion of the silver coating to the steel shell the assembly may be removed from the furnace and cooled and thereupon the outer iron sheath is removed as by machining or stripping and the silver coating is then machined to the desired finished dimensions and is ready for use.

The outer iron coating acts as a support for the plastic or liquid silver during fusion in the furnace. In case pressure is used in the furnace the outer iron coating or sheath prevents the pressure medium such as gas from seeping between the silver coating and the steel bearing shell and also protects the underneath assembly from contamination or oxidation.

The graphite coating 3 over the silver plating 2 prevents fusion of the outer iron coating 4 and the silver and steel shell inside said outer iron coating and permits easier removal after heat treatment of said outer iron coating.

The outer iron sheath may be made of stampings joined together as by welding if desired or otherwise fabricated to form a suitable support to prevent the heated silver from sagging while in the furnace and subjected to heat. In this procedure the outer iron shell may be extended high enough and kept open at the top to permit evacuation of entrapped gas in or around the silver. This procedure is desirable when vacuum treatment precedes pressure treatment in the furnace.

In any case by my invention a good bond is secured between the silver or other antifriction metal and the steel bearing sleeve when a supporting sheath as of metal having a sufficiently higher melting point than silver is placed about the silver and steel shell assembly so as to prevent serious movement of the silver during fusion. By my invention a much less quantity of silver is needed and a much better bond is secured and rejects due to poor bond are greatly reduced than by present practice.

By my invention a layer of powdered silver or a silver shell may be used to coat the steel bearing blank instead of an electrodeposited coating of silver prior to sheathing in iron and prior to heat treatment. Such methods are described in my above-mentioned copending U. S. patent application Serial No. 552,501, filed September 2, 1944, now Patent No. 2,478,037.

Precleaning of the steel bearing shell 1 prior to assembly with silver or electroplating with silver is advantageously accomplished by subjecting the shell to a deoxidizing flame as of hydrogen or oxy-acetylene to remove all oxides and residue from machining. This flame may be placed over the silver plating solution so that the steel shells pass through the flame just prior to entering the plating solution without further exposure to atmosphere If preferred the assembly may be subjected to high frequency heating to effect fusion and rapid production. This method is most desirable where large numbers of similar sized and shaped pieces are produced. Vacuum followed by pressure treatment may be applied in this fusion procedure also.

The unit as shown in Fig. I may be subjected to gas pressure during heat treatment without fear of leakage of the gas beneath the silver coating due to the sheath of iron over the entire assembly also this sheath of iron permits of the use of much higher temperatures without sagging of the silver due to plasticity or liquidity with the result that better penetration of the steel bearing shell is obtainable and hence a better bond. Nickel plating of the steel blank prior to application of the silver assists in securing a perfect bond.

The steel shell may be made of a steel stamping if desired and the silver coating 2 may be made of a silver stamping or of strip silver if desired and applied to the steel shell by pressing, spinning, welding or a combination of these methods prior to final coating as with iron and subjection to heat in the furnace to fuse.

The support coating may be made of other heat-resisting materials than those mentioned and may be applied in other ways. Sprayed metals such as iron will do as will also sprayed cements such as iron cement or the supporting shell 4 may be cast in place of a composition of high temperature cement such as plaster of Paris or modifications thereof. A porous carbon powder compact may also be applied and used as the supporting shell for heat treatment, provided it is dense enough to prevent penetration of liquid silver And thus Fig. II of the drawings illustrates a cross section of lamination supported in this way wherein again 1 represents a nickle plated steel bearing shell having applied thereto lamina of silver or other antifriction metal 2 the whole being enclosed in an applied heat-resisting support 3' prior to fusion.

Having described by invention, I claim the following:

1. A method of uniting a metal to a metal of higher melting point, comprising applying at ordinary temperature a layer of such metal to the metal of higher melting point, shaping to the exposed face of such layer a close-fitting gas-impervious support, subsequently heating the assembly to the fusion point of the lower melting metal, and finally stripping off the support.

2. A method of uniting a metal to a metal of higher melting point, comprising applying at ordinary temperature a layer of such metal to the metal of higher melting point, applying to such layer a coating of inert material, shaping to the latter a close-fitting gas-impervious support, subsequently heating the assembly to the fusion point of the lower melting metal, and finally stripping off the support.

3. A method of uniting a lower melting metal to steel, comprising applying a surface layer of lower melting metal on the steel surface, applying a layer of iron on the lower melting metal, heating the composite article to the fusion point of the lower melting metal, and finally stripping off the iron layer.

4. A method of uniting a lower melting metal to steel, comprising applying a surface layer of silver on the steel, superposing a layer of iron, heating the assembly to the fusion point of the silver, and finally stripping off the iron layer.

5. A method of uniting a lower melting metal to steel, comprising assembling shells of lower melting metal and steel, superposing a layer of iron, heating the assembly to the fusion point of the lower melting metal, and finally stripping off the iron layer.

6. A method of uniting a lower melting metal to steel, comprising assembling shells of silver and steel, superposing a layer of iron, heating the assembly to the fusion point of the silver, and finally stripping off the iron layer.

7. A method of making bearings, which comprises applying to an assembly of layers of silver and steel a conforming sheath of metal of higher melting point than the silver, sealing the sheath at least at the bottom, heating to fusion of the silver, cooling, and removing the conforming sheath.

8. A method of making bearings, which comprises applying to an assembly of layers of silver and a higher melting metal a conforming sheath of metal of higher melting point than the silver, sealing the sheath at least at the bottom, heating to fusion of the silver, cooling, and removing the conforming sheath.

9. A method of making bearings, which comprises applying to an assembly of layers of bearing metal and higher melting backing metal a conforming sheath of metal of higher melting point than the bearing metal, sealing the sheath at least at the bottom, heating to fusion of the bearing metal, cooling, and removing the conforming sheath.

10. A method of making bearings, which comprises electrodepositing on the silver face of an assembly of layers of silver and steel, a thin metal envelope of higher melting point than the silver, heating to fusion of the silver, cooling, and removing the thin metal envelope.

11. A method of making bearings, which comprises electrodepositing on the silver face of an assembly of layers of silver and a higher melting backing metal, a thin metal envelope of higher melting point than the silver, heating to fusion of the silver, cooling, and removing the thin metal envelope.

12. A method of making bearings, which comprises conforming against the bearing metal face of an assembly of layers of bearing metal and higher melting backing metal, a thin metal envelope of higher melting point than the bearing metal, heating to fusion of the bearing metal, cooling, and removing the thin metal envelope.

13. A method of making bearings, which comprises conforming against the silver face of an assembly of layers of silver and steel, a barrier impervious against liquid metal and gas, heating to fusion of the silver, cooling, and removing the impervious barrier.

14. A method of making bearings, which comprises conforming to the silver face of an assembly of layers of silver and a higher melting backing metal, a barrier impervious against liquld metal and gas, heating to fusion of the silver, cooling, and removing the impervious barrier.

15. A method of making bearings, which comprises conforming against the bearing metal face of an assembly of layers of bearing metal and a higher melting backing metal, a barrier impervious against liquid metal and gas, heating to fusion of the bearing metal, cooling, and removing the impervious barrier.

JOSEPH B. BRENNAN.

REFERENCES CITED

The following references are of record in the file of this patent:

UNITED STATES PATENTS

| Number | Name | Date |
|---|---|---|
| 448,594 | Smith | Mar. 17, 1891 |
| 880,405 | Schmidt | Feb. 25, 1908 |
| 898,404 | Edison | Sept. 8, 1908 |
| 1,328,336 | Northrup | Jan. 20, 1920 |
| 1,383,174 | Udy et al. | June 28, 1921 |
| 1,433,213 | Lowell | Oct. 24, 1922 |
| 1,567,625 | Smith | Dec. 29, 1925 |
| 1,751,489 | Miller | Mar. 25, 1930 |
| 1,812,172 | Rohn | June 30, 1931 |
| 1,823,938 | Henke | Sept. 22, 1931 |
| 2,060,530 | Reilly | Nov. 10, 1936 |
| 2,066,247 | Brownback | Dec. 29, 1936 |
| 2,164,737 | Ford | July 4, 1939 |
| 2,187,348 | Hodson | Jan. 16, 1940 |
| 2,187,755 | Ryder | Jan. 23, 1940 |
| 2,275,503 | Brown | Mar. 10, 1942 |
| 2,331,584 | Underwood | Oct. 12, 1943 |
| 2,386,951 | Howe | Oct. 16, 1945 |